US009376629B2

(12) United States Patent
Fan et al.

(10) Patent No.: US 9,376,629 B2
(45) Date of Patent: Jun. 28, 2016

(54) RECOVERY OF HYDROCARBONS FROM HYDROCARBON-CONTAINING MATERIALS

(71) Applicant: GREEN SOURCE ENERGY LLC, Austin, TX (US)

(72) Inventors: Liang-tseng Fan, Manhattan, KS (US); Shahram Reza Shafie, Austin, TX (US)

(73) Assignee: GREEN SOURCE HOLDINGS LLC, Austin, TX (US)

( * ) Notice: Subject to any disclaimer, the term of this patent is extended or adjusted under 35 U.S.C. 154(b) by 344 days.

(21) Appl. No.: 13/900,979

(22) Filed: May 23, 2013

(65) Prior Publication Data

US 2013/0331624 A1 Dec. 12, 2013

Related U.S. Application Data

(60) Provisional application No. 61/651,805, filed on May 25, 2012.

(51) Int. Cl.

| | |
|---|---|
| ***C10G 1/04*** | (2006.01) |
| ***C10G 21/27*** | (2006.01) |
| ***C09K 8/34*** | (2006.01) |
| ***E21B 43/28*** | (2006.01) |
| ***E21B 43/16*** | (2006.01) |

(52) U.S. Cl.

CPC . *C10G 1/042* (2013.01); *C09K 8/34* (2013.01); *C10G 1/04* (2013.01); *C10G 21/27* (2013.01); *E21B 43/16* (2013.01); *E21B 43/28* (2013.01)

(58) Field of Classification Search

CPC .......... C10G 1/042; C10G 21/27; C10G 1/04; E21B 43/16; E21B 43/28; C09K 8/34

See application file for complete search history.

(56) References Cited

U.S. PATENT DOCUMENTS

| | | | | |
|---|---|---|---|---|
| 3,909,390 A | | 9/1975 | Urban | |
| 4,481,099 A | * | 11/1984 | Mitchell | C10G 1/04 208/390 |
| 5,143,598 A | * | 9/1992 | Graham | C10G 1/04 208/390 |
| 6,872,754 B1 | | 3/2005 | Wortham | |
| 2008/0083534 A1 | * | 4/2008 | Daussin | C09K 8/592 166/272.4 |

FOREIGN PATENT DOCUMENTS

| | | | |
|---|---|---|---|
| GB | 861 897 | A | 3/1961 |
| GB | 2 236 323 | A | 4/1991 |
| WO | 00 43471 | A1 | 7/2000 |
| WO | 2006 104662 | A1 | 10/2006 |
| WO | 2011013025 | A1 | 2/2011 |

OTHER PUBLICATIONS

J. Roy et al.: "Action of Dipolar Aprotic Solvents on Coal," Indian Journal of Technology, vol. 14, pp. 298-300, Jun. 1976.

Notification of Transmittal of the International Search Report and the Written Opinion of the International Searching Authority cited in PCT/US2013/042021, dated Nov. 29, 2013, 18 pgs.

* cited by examiner

*Primary Examiner* — Randy Boyer
*Assistant Examiner* — Juan Valencia
(74) *Attorney, Agent, or Firm* — Rothwell, Figg, Ernst & Manbeck P.C.

(57) ABSTRACT

A method of extracting hydrocarbon-containing organic matter from a hydrocarbon-containing material includes the steps of providing a hydrocarbon-extracting solvent containing DMSO, Cellosolve, or a mixture thereof; contacting the hydrocarbon-containing material with the hydrocarbon-extracting solvent to form an extraction mixture; extracting the hydrocarbon material into the hydrocarbon-extracting solvent; and separating the extracted hydrocarbon material from a residual material not extracted.

38 Claims, No Drawings

RECOVERY OF HYDROCARBONS FROM HYDROCARBON-CONTAINING MATERIALS

FIELD OF THE INVENTION

The present invention relates to the field of recovering hydrocarbons from materials containing hydrocarbons using low-toxicity, low-volatility and relatively low-priced solvents.

BACKGROUND OF THE INVENTION

Recovery of hydrocarbons from fossil fuels and polymeric materials via the liquefaction, solubilization, dissolution, and/or extraction is highly convoluted. This can be attributed to the fact that fossil fuels and polymeric materials, e.g., such as oil shale, coal, oil (tar) sands, heavy crude oil, crude oil, natural gas, oil sludge, organic garbage, rubber and plastics containing organic matter, e.g., as bitumen, kerogen, natural asphalt, asphaltene and/or polymers, comprise organic polymers of extremely complex structures. A need exists to produce additional liquid feed stock for the manufacture of liquid fuels, gaseous fuels, as well as for the recovery of discarded polymeric materials such as tires and plastics to minimize the consumption of material resources and energy required for processing such material resources.

Processes for the devulcanization of rubber, as well as the liquefaction, solubilization and/or extraction of hydrocarbon-containing organic matter from hydrocarbon-containing materials, using turpentine liquids have been developed as described in U.S. Pat. No. 7,767,722 and U.S. Pat. No. 8,101,812, which are incorporated by reference herein in their entirety.

It is, however, highly desirable that additional such technologies be developed, which deploy different sustainable, environmentally-friendly, i.e., "green," solvents to further enhance the efficacy and/or lower the costs of the technologies or processes for the recovery of hydrocarbons from hydrocarbon-containing materials. A technical article by Roy et al. (Indian Journal of Technology, vol. 14, pp. 298-300, 1976) reported that Dimethyl sulfoxide (DMSO) has an extraction capacity of 23%. However, the coal was contacted with a very high ratio of DMSO to coal (30:1) for 7-16 hours. When micron-sized (325 mesh) coal was used, a higher yield of 45% was obtained. Nevertheless, the extraction yield was not directly measured from the reduction in the weight of coal but indirectly estimated from the increase in the sulfur content of coal because the DMSO containing sulfur was adsorbed by the coal sample and could not be separated by washing. Importantly, such fine particles used in Roy et al. cannot be used in industrial hydrocarbon extraction processes because of not only the impracticality and costs of grinding coal to such a small size, but also the concomitant danger of explosion.

SUMMARY OF INVENTION

In one embodiment, this disclosure provides a method of removing, recovering, dissolving, extracting, and/or liquefying hydrocarbon-containing organic matter from hydrocarbon-containing materials, such as fossil fuels and polymeric materials, e.g., coal, oil shale, oil (tar) sands, heavy crude oil, oil sludge, garbage, rubber, and plastics.

In one embodiment, the method comprises providing a hydrocarbon-extracting solvent selected from DMSO (also termed as Dimethyl sulfoxide, Methyl sulfoxide, or Methylsulfinylmethane), Cellosolve (also termed as 2-Ethoxyethanol, Ethylene glycol ethyl ether, Oxitol, or EthylCellosolve), or a mixture thereof, and contacting one or more hydrocarbon-containing materials with the hydrocarbon-extracting solvent so as to recover hydrocarbon-containing organic matter.

In one embodiment, the hydrocarbon-extracting solvent is a liquid, e.g., liquid DMSO and/or liquid Cellosolve. The method can further include the steps of liquefying, dissolving, and/or extracting hydrocarbon-containing organic matter from one or more hydrocarbon-containing materials into the hydrocarbon-extracting solvent and separating the recovered hydrocarbons from any residual material not liquefied or extracted.

In another embodiment, the present invention provides a composition for removing, recovering, dissolving, extracting, and/or liquefying hydrocarbon-containing organic matter from hydrocarbon-containing materials, such as fossil fuels and polymeric materials, e.g., oil shale, coal, oil (tar) sands, heavy crude oil, crude oil, natural gas, oil sludge, garbage, rubber, and plastics. The composition includes a hydrocarbon-extracting solvent selected from DMSO, Cello-Solve, or a mixture thereof.

DETAILED DESCRIPTION OF THE INVENTION

In certain embodiments, this disclosure is related to a method and composition for avoiding one or more of: (1) operating at an inordinately elevated pressure; (2) operating at a very high temperature; (3) the need for expensive processing vessels and equipment that require the external supply of hydrogen under extreme conditions; (4) being subjected to a mixture, or composition, of two or more reagents, catalysts and/or promoters, which are frequently highly toxic, dangerous, carcinogenic, and/or are neither renewable nor recyclable; (5) requiring to supply a special form of energy, e.g., microwave radiation; (6) long process times for partial liquefaction, solubilization or extraction; (7) requiring extraordinarily fine particles with a size of about 200 mesh (0.074 mm) or smaller, which is profoundly difficult and costly to manufacture and handle; and (8) being incapable of recovering and recycling the necessary reagents, catalysts and/or promoters.

According to one embodiment, a method is provided including the steps of liquefying, solubilizing, dissolving, removing, and/or extracting hydrocarbon-containing organic matter from a hydrocarbon-containing material, such as oil shale, coal, oil (tar) sands, or a reservoir containing heavy crude oil, crude oil, natural gas (which frequently coexists with crude oils and other said fossil fuels), or a combination thereof. Hydrocarbon-containing organic matter includes, but is not limited to, heavy crude oil, crude oil, natural gas, and the like. Hydrocarbon-containing organic matter can be solid, semi-solid, liquid, sludge, viscous liquid, liquid or gaseous form. Other materials that are suitable hydrocarbon-containing materials for treatment using the method of this invention include liquids and solids that include hydrocarbon-containing materials as well as a residual material. Exemplary hydrocarbon-containing materials can also include oil tank bottoms, oil pit or pond sludge and slurry mix, discarded foods, manure, sewage sludge or municipal garbage. In some embodiments, the hydrocarbon containing material is not coal.

Liquefying, solubilizing, dissolving, removing, and/or extracting the hydrocarbon-containing organic matter includes the step of providing a hydrocarbon-extracting solvent, contacting the hydrocarbon-containing material with the hydrocarbon-extracting solvent so as to extract at least a portion of the hydrocarbon-containing organic matter from the hydrocarbon-containing material into the hydrocarbon-extracting solvent to create an extraction mixture that includes the hydrocarbon-containing organic matter that has been removed from the hydrocarbon-containing material and the hydrocarbon-extracting solvent, and separating the extracted organic matter in the hydrocarbon-extracting solvent from any residual material not extracted. The hydrocarbon-extracting solvent can comprise, consist essentially of, or consist of an effective amount of hydrocarbon-extractive solvent selected from DMSO, Cellosolve, or a mixture thereof. In one aspect, the effective amount is an amount that extracts at least 50% of the hydrocarbon-containing organic matter contained in the contacted hydrocarbon-containing material.

In certain embodiments, the ratio of hydrocarbon-extracting solvent to hydrocarbon-containing material is in a range of about 1:2 and 6:1 by weight, or in a range of about 1:2 and 4:1 by weight. In another embodiment the ratio of hydrocarbon-extracting solvent to hydrocarbon-containing material is in a range of about 1:1 and 3:1 by weight. In embodiments relating to reservoir recovery, the ratio can be greater than or equal to about 3:1, and in other embodiments relating to reservoir recovery the ratio can be greater than or equal to about 4:1. For purposes of extraction from a reservoir, pore volume is used to determine an estimated measure of the hydrocarbon-containing material. In other aspects of this invention, such as in the use of oil (tar) sands, coal and oil shale, volume of the hydrocarbon-containing material can be more directly estimated.

In certain embodiments, the minimum organic matter contained in the hydrocarbon-containing material is greater than or equal to about 1% by weight, in other embodiments greater than or equal to about 10% by weight, and in still further embodiments greater than or equal to about 14% by weight of the hydrocarbon-containing material.

Oil shale, coal, oil (tar) sands, heavy crude oil, crude oil, and natural gas can contain as little as about 1% naturally occurring hydrocarbon-containing organic matter. The methods and liquids described are operable to extract up to about 100% of the hydrocarbon-containing organic matter from hydrocarbon-containing materials containing very low to very high amounts of hydrocarbons (i.e., material that includes as little as about 1% by weight hydrocarbon material to material that includes up to about 100% by weight hydrocarbon material).

In certain embodiments, the liquefaction, solubilization, and/or extraction of fossil fuels or hydrocarbon-containing organic matter can be carried out at a temperature within the range of about 2° C. to about 300° C. In certain embodiments, the organic matter or material is contacted with a hydrocarbon-extracting solvent at a temperature of less than about 300° C., less than about 180° C., or less than about 100° C. In other embodiments, the liquefaction, solubilization and/or extraction temperatures can be within the range of about 20° C. to about 200° C., or 50° C. to 160° C. The pressure under which the liquefaction, solubilization and/or extraction of fossil fuels is to be carried out may typically be within the range of about $1.0\times10^4$ Pascals (0.1 atm) to about $5.0\times10^6$ Pascals (50.0 atm). In certain embodiments, the process can be conducted at a pressure between about $5.0\times10^4$ Pascals (0.5 atm) to about $8.0\times10^5$ Pascals (8.0 atm). In certain other embodiments, the fossil fuels or hydrocarbon-containing organic matter to be liquefied, solubilized and/or extracted by immersion in, or contact with, one or more hydrocarbon-extracting solvent can be in the form of particles, pieces, chunks or blocks of fossil fuels whose sizes are within the range of about 0.74 mm to about 10 mm into the interior portion of a liquefaction, solubilization or extraction vessel (hereafter also referred to as the reactor or contacting vessel interchangeably) that contains one or more of the said liquefaction, solubilization and/or extraction reagents. In certain embodiments, the sizes of the particles, pieces, chunks or blocks of fossil fuels are within the range of about 0.075 mm (200 mesh) to about 20 mm. In certain embodiments, the particles, pieces, chunks or blocks of fossil fuels are agitated by passing the liquefaction, solubilization and/or extraction reagent or reagents in the form of liquid through the particles, pieces, chunks or blocks by boiling the reagent or reagents. In certain embodiments, the duration of liquefaction, solubilization and/or extraction is from about 1 minute to about 20 hours. The fossil fuels can be partially or fully liquefied, solubilized and/or extracted; the degree of liquefaction, solubilization and/or extraction can be effected by controlling the operating conditions, such as temperature, pressure, intensity of agitation and duration of operation, and/or adjusting the type, relative amount and concentration of the liquefaction, solubilization or extraction reagent or reagents in the reactor.

The basis of one aspect of the invention is the unexpected discovery that when DMSO or Cellosolve was added to oil (tar) sands, the conversion, i.e., the degree of extraction, of bitumen (organic matter) from the oil-sand sample was determined to be very high, e.g., up to 100%, within 15 minutes of contacting. Because the amounts of DMSO or Cellosolve that can be used to achieve significant hydrocarbon extraction, as well as the conditions for contacting are economically practicable, it was unexpectedly found that the inventive method is highly advantageous for use in the field of industrial scale hydrocarbon extraction. The hydrocarbon-extracting solvents to be used in the disclosed method are renewable and "green," i.e., low in toxicity and volatility, and relatively inexpensive, as compared to other liquefaction, solubilization and/or extraction reagents for fossil fuels, such as tetraline, xylene, anthracene, and various solutions or mixtures of these reagents with other compounds. For example, DMSO can be manufactured in a renewable process stream in the paper production industry. It has very low toxicity to humans and the environment, and is recyclable after most uses.

An aspect of the present invention provides a method of liquefying, solubilizing and/or extracting fossil fuels or hydrocarbon-containing organic matter from hydrocarbon-containing material, such as coal, oil shale and oil (tar) sands, wherein a portion of solid or semi-solid fossil fuels is contacted with a hydrocarbon-extracting solvent in an extraction mixture, which can be in an absence of an alkali metal, catalyst, hydrogen ($H_2$) and/or carbon monoxide (CO). While hydrogen and CO can be useful as a mixing agent, one embodiment of the invention includes the process and the composition in the absence of hydrogen and CO.

In certain embodiments, the hydrocarbon-extracting solvent is selected from DMSO, Cellosolve, or a mixture thereof. In certain embodiments, the method and/or the hydrocarbon-extracting solvent contain no limonene.

The present invention avoids the environmental, economic, and practical disadvantages that have plagued prior extraction systems. To date, solvents comprising various surfactants, surface active agents, alkaline or acidic solutions, salts, volatile organic compounds, and alcohols have been used with varying degrees of success. However, such formulations may have certain drawbacks that one or more embodiments of the current invention overcome. In one embodiment, the renewable and "green" extraction solvents of the present invention are substantially surfactant-free. In another embodiment, the extraction solvents are surfactant-free. Further, the use of the extraction solvents of the present invention for extracting hydrocarbon-containing organic matter from naturally occurring geological formations avoids the economic and environmental costs associated with other known liquefaction, solubilization and/or extraction reagents for fossil fuels.

In certain embodiments, an aspect of the present invention provides a method for extracting hydrocarbon-containing materials further comprising the step of using a substantially surfactant-free non-aqueous liquid comprising a turpentine liquid. Non-aqueous solvents have the advantage of less leakage into the environment, increased extraction of hydrocarbons, avoidance of sulfuric acid formation upon contacting hydrogen sulfide gases and other reactive sulfur compounds trapped within hydrocarbon containing materials, corrosion inhibition, viscosity reduction, and capillary effect elimination. It has been found that the combination of the hydrocarbon-extracting solvent of the present disclosure provides enhanced hydrocarbon extraction when combined with a turpentine liquid. The combination of DMSO and a turpentine liquid is particularly effective at enhancing extraction of hydrocarbons from hydrocarbon-containing materials into the mixture of DMSO and turpentine liquid.

As used herein, a "turpentine liquid" can be selected from natural turpentine, synthetic turpentine, mineral turpentine, pine oil, α-pinene, β-pinene, α-terpineol, β-terpineol, γ-terpineol, polymers thereof, geraniol, 3-carene, dipentene (p-mentha-1,8-diene), nopol, pinane, 2-pinane hydroperoxide, terpin hydrate, 2-pinanol, dihydromycenol, isoborneol, p-menthan-8-ol, α-terpinyl acetate, citronellol, p-menthan-8-yl acetate, 7-hydroxydihydrocitronellal, menthol, anethole, camphene; p-cymene, anisaldeyde, 3,7-dimethyl-1,6-octadiene, isobornyl acetate, ocimene, alloocimene, alloocimene alcohols, 2-methoxy-2,6-dimethyl-7,8-epoxyoctane, camphor, citral, 7-methoxydihydro-citronellal, 10-camphorsulphonic acid, cintronellal, menthone, or mixtures thereof.

According to an aspect, solid or semi-solid fossil fuels or other hydrocarbon-containing materials, such as coal, oil shale, oil (tar) sands and heavy crude oil, or for example oil tank bottoms, oil pit or pond sludge, discarded foods, manure, sewage sludge or municipal garbage, may be provided in any size that facilitates contact with a hydrocarbon-extracting solvent of this disclosure. The fossil fuels or hydrocarbon-containing materials can be provided as particles, pieces, chunks, or blocks, for example, large fragments or pieces of coal or oil shale. According to a certain aspect of the invention, the fossil fuel or hydrocarbon-containing material is provided as particles. According to a certain aspect of the invention, the particles of fossil fuel or hydrocarbon-containing materials have an average particle size of from about 0.01 mm to about 100 mm. In certain other embodiments, the particles of fossil fuel have an average particle size from about 4 mm to about 25 mm.

According to an aspect of the present invention, a second liquid can be added to the hydrocarbon-extracting solvent. According to a certain aspect of the invention, the second liquid can be selected from lower aliphatic alcohols, alkanes, aromatics, aliphatic amines, aromatic amines, carbon bisulfide and mixtures thereof. Exemplary mixtures include solvents manufactured in petroleum refining, such as decant oil, light cycle oil and naphtha, or solvents manufactured in dry distilling coal and fractionating liquefied coal.

As used herein, lower aliphatic alcohols refers to primary, secondary and tertiary monohydric and polyhydric alcohols of between 2 and 12 carbon atoms. As used herein, the term "alkanes" refers to straight chain and branched chain alkanes of between 5 and 22 carbon atoms. As used herein, the term "aromatics" refers to monocyclic, heterocyclic and polycyclic compounds. As used herein, the phrase "aliphatic amines" refers to primary, secondary and tertiary amines having alkyl substituents of between 1 and 15 carbon atoms. In certain embodiments, benzene, naphthalene, toluene or combinations thereof are used. In another embodiment, the lower aliphatic alcohols noted above can be used. In one embodiment the solvent is selected from ethanol, propanol, isopropanol, butanol, pentane, heptane, hexane, benzene, toluene, xylene, naphthalene, anthracene, tetraline, triethylamine, aniline, carbon bisulfide, and mixtures thereof, at a temperature and pressure operable to maintain the solvent in liquid form.

In certain embodiments, the ratio of hydrocarbon-extracting solvent to any other hydrophobic solvent contained in the composition is greater than or equal to about 1:1, in certain embodiments greater than or equal to about 9:4. In certain embodiments, the ratio is greater than or equal to about 3:1. In yet other embodiments, the ratio is greater than or equal to about 4:1.

Another embodiment of the invention comprises contacting the hydrocarbon-containing material with the hydrocarbon-extracting solvent in combination with a turpentine liquid mixture hereinafter referred to as the blend of turpentine liquids. The blend of turpentine liquids includes α-terpineol, β-terpineol, β-pinene, and p-cymene. In one embodiment, the blend of turpentine liquids includes at least about 30% α-terpineol, and at least about 15% β-terpineol. In another embodiment, the blend of turpentine liquids includes about 40-60% α-terpineol, about 30-40% β-terpineol, about 5-20% β-pinene, and about 0-10% p-cymene. In another embodiment, the blend of turpentine liquids includes about 50% α-terpineol, about 35% β-terpineol, about 10% β-pinene, and about 5% p-cymene. In an alternative embodiment, a blend of turpentine liquids includes about 40-60% α-terpineol, about 30-40% α-pinene, about 5-20% β-pinene, and about 0-10% p-cymene. In another embodiment, a blend of turpentine liquids includes about 50% α-terpineol, about 35% α-pinene, about 10% β-pinene, and about 5% p-cymene.

In one aspect, the present invention relates to a readily deployed composition for the extraction, dissolution, removal, liquefaction and/or solubilization of fossil fuels and polymeric materials, e.g., coal, oil shale, oil (tar) sands, heavy crude oil, oil sludge, garbage, rubber, and plastics.

In certain embodiments, this disclosure provides a composition that comprises, consists essentially of or consists of a hydrocarbon-extracting solvent selected from DMSO, Cellosolve, or a mixture thereof. Thus, in certain embodiments, the basic and novel characteristics of the present invention include a composition that consists essentially of hydrocarbon-extracting solvents as listed, described, or suggested herein, and excludes other active hydrocarbon-extracting ingredients.

In certain embodiments, one or more surfactants may be added to the hydrocarbon-extracting solvent. Yet in other embodiments, the hydrocarbon-extracting solvent is surfactant-free or substantially surfactant-free.

In another embodiment, the inventive composition is substantially non-aqueous or the method involves contacting said material or surface with a substantially non-aqueous hydrocarbon-extracting solvent. In a preferred embodiment the hydrocarbon-extracting solvent is non-aqueous.

In certain embodiments, the inventive composition or method involves boiling the hydrocarbon containing materials after contacting with the hydrocarbon-extracting solvent.

In some embodiments, the hydrocarbon-containing material may be contacted with non-aqueous solvents prior to, during, or after contacting the hydrocarbon containing materials with the hydrocarbon-extracting solvent.

In certain embodiments, the method is deployed in such a way to avoid slurry or emulsion formation. In such embodiments, the hydrocarbon containing materials is provided as a one-phase homogenous liquid, which is contacted with the hydrocarbon-containing material to form a one-phase homogeneous extraction mixture and residual material, e.g., solids and other materials that do not contain substantial amounts of hydrocarbons. In preferred embodiments, a substantial amount of hydrocarbon-containing organic matter from the contacted hydrocarbon-containing material is extracted into the one-phase homogenous hydrocarbon-containing solvent.

As used herein, the term "substantial amount" may include and amount between about 30 and about 100%, preferably at least about 50%, more preferably at least about 60%. In some embodiments, a "substantial amount" includes at least 80, 90, or 100%.

In certain embodiments, the method is directed to a method that extracts at least 50% of hydrocarbon-containing organic matter from the contacted hydrocarbon-containing material into the one-phase homogenous hydrocarbon-containing solvent. In yet other embodiments, the method is directed to a method that extracts at least about 70% of hydrocarbon-containing organic matter from the contacted hydrocarbon-containing material into the one-phase homogenous hydrocarbon-containing solvent. In some embodiments, the method is directed to a method that extracts at least about 80% of hydrocarbon-containing organic matter from the contacted hydrocarbon-containing material into the one-phase homogenous hydrocarbon-containing solvent. In some embodiments, the method excludes methods that extract less than 50% of hydrocarbon-containing organic matter from the contacted hydrocarbon-containing material into the one-phase homogenous hydrocarbon-containing solvent.

In certain embodiments, if the composition used is not non-aqueous, the ratio of hydrocarbon-extracting solvent to water is greater than or equal to about 1:1 by volume, to avoid slurry formation, which may render separation of the extracted organic matter in the turpentine liquid-containing fluid difficult.

According to an aspect of the method, the fossil fuel is contacted by the hydrocarbon-extracting solvent in the presence of an energy input selected from thermal energy in excess of about 300° C., pressure in excess of 50 atm, microwave energy, ultrasonic energy, ionizing radiation energy, mechanical shear-forces, and mixtures thereof.

According to an aspect of the method, a liquefaction or solubilization catalyst is provided to the mixture of fossil fuel and hydrocarbon-extracting solvent.

According to an aspect of the method, the reaction or solubilization mixture is supplemented by the addition of a compound selected from hydrogen, carbon monoxide, water, metal oxides, metals, and mixtures thereof.

According to an aspect of the method, a microorganism is included in the reaction or solubilization mixture. Select chemical bonds, for example, sulfur cross-links and oxygen cross-links, in the hydrocarbons of fossil fuels and other hydrocarbon-containing materials are broken by biotreatment with bacillus-type thermophilic and chemolithotrophic microorganisms selected from naturally occurring isolates derived from hot sulfur springs. The breaking of these select chemical bonds facilitates the solubilization of hydrocarbons in fossil fuels and other hydrocarbon-containing materials.

In accordance with one embodiment, a method is provided for extracting hydrocarbon-containing organic matter from a hydrocarbon-containing material comprising a viscous liquid, liquid or gaseous fossil fuel material. The method provides a first liquid that includes a hydrocarbon-extracting solvent. The hydrocarbon-extracting solvent is contacted with the hydrocarbon-containing material in-situ in an underground formation containing said fossil fuel material, thereby forming an extraction mixture so as to extract hydrocarbon-containing organic matter into the hydrocarbon-extracting solvent and form an extraction liquid. The extraction liquid is removed from the formation, wherein the extraction liquid includes the hydrocarbon-extracting solvent containing the extracted hydrocarbon-containing organic matter. The extracted hydrocarbon-containing organic matter is separated from a residual material not extracted. The method can further include separating said extracted hydrocarbon-containing organic material from the hydrocarbon-extracting solvent. The viscous liquid, liquid or gaseous fossil fuel material can be oil shale, coal, oil (tar) sands, heavy crude oil, crude oil, natural gas, or a combination thereof. The underground formation may be a crude oil reservoir or a natural gas reservoir, for example.

The present invention can be deployed readily in-situ to liquefy and/or solubilize directly the fossil fuels in underground formations, and extract the resulting liquid products from such formations.

An exemplary extraction reagent of the present invention may be a fluid, e.g. a liquid, which may have a very strong physicochemical affinity with bituminous organic matter, including bitumen, kerogen and/or tar, in coal, oil shale and oil (tar) sands. When the extraction solvent of the present invention and bituminous organic matter comprising mainly hydrocarbons come into direct contact with each other, the organic matter is extracted into the extraction solvent of the present invention, thereby liquefying the organic matter. Upon contact, the hydrocarbons and the extraction solvent of the present invention rapidly form a homogeneous solution, i.e., a one-phase liquid.

It is possible to take advantage of the physicochemical affinity between the extraction solvent of the present invention and the bituminous matter for enhancing oil recovery from oil reservoirs under in-situ conditions. The prior art in-situ recovery techniques applied to-date in oil reservoirs resort mostly to the so-called frontal displacement method. This process is strictly controlled by the characteristics of the multi-phase fluid flow in a porous medium. This tends to leave a large portion, often exceeding about 40% of the original oil, unrecovered from the formation, even for the "good" low viscosity oil reservoirs. The extraction reagent of the present invention enhances oil recovery by overcoming the complex behavior of prior multi-phase flow techniques prevailing under in-situ conditions.

The present invention provides an improved method for increasing flowability and extraction of viscous or immobile hydrocarbon containing materials by contacting a hydrocarbon-containing material with a hydrocarbon-extracting solvent, which decreases the viscosity of the hydrocarbon-containing material. Flow is also enhanced by the non-aqueous nature of the hydrocarbon-extracting solvent due to elimination of the capillary effect associated with aqueous solutions. Contacting can take place in situ or ex situ.

One method of the present invention injects an extraction solvent of the present invention into an oil or natural gas reservoir through an injection well.

Oil is extracted into the extraction solvent of the present invention when the two come into contact in an oil reservoir, thereby yielding a homogeneous solution, i.e., a one-phase liquid. The extraction solvent of the present invention does not simply displace the oil as it travels from the injection well to a production well in fluid communication with an underground formation. Rather, extraction of previously trapped oil into the extraction solvent of the present invention continues until the extraction reagent is completely exhausted in forming the homogeneous solution with oil. Thereafter, this homogeneous solution that includes the extracted hydrocarbons then simply flows through the pores of the reservoir as a one-phase liquid, eventually reaching a production well.

Still other aspects and advantages of the present invention will become easily apparent by those skilled in the art from this description, wherein certain embodiments of the invention are shown and described simply by way of illustration of the best mode contemplated of carrying out the invention. As will be realized, the invention is capable of other and different embodiments, and its several details are capable of modifications in various obvious respects, without departing from the invention. Accordingly, the description is to be regarded as illustrative in nature and not as restrictive.

EXAMPLES

Example 1

In this example, bitumen (organic matter) in high-grade oil (tar) sands from Alberta, Canada was solubilized and extracted with solvent DMSO, which is of the commercial grade. Alberta Research Council provided the following proximate analyses for the oil-sand sample: 87.13 wt. % of solids; 12.49 wt. % of bitumen; and 0.02 wt. % of moisture. About 50.0 grams of solvent DMSO were added to about 50.0 grams of the oil-sand sample in a 200-ml glass beaker (reactor) with a magnetic stirrer, thus giving rise to the solvent-to-sample ratio of about 1 to 1. This beaker (reactor), containing the resultant mixture of DMSO and oil (tar) sands, was maintained at a temperature of about 80 degrees C. or by heating the beaker (reactor) on a temperature-controlled hot plate. The pressure in the beaker (reactor) remained at the ambient pressure of about 1 atm. After about 5 minutes, the liquid in the beaker (reactor) was decanted and filtered, and the solids remaining in the beaker were repeatedly washed with hot IPA (isopropanol) with a temperature near its boiling point and dried the beaker together with the filter paper to a constant weight in a vacuum oven. On the basis of weight loss, the conversion, i.e., the degree of extraction, of bitumen (organic matter) from the oil-sand sample was determined to be about 70.4 wt. %.

Example 2

In this example, bitumen (organic matter) in low-grade oil (tar) sands from Alberta, Canada was solubilized and extracted with solvent DMSO, which is of the commercial grade. Alberta Research Council provided the following proximate analyses for the oil-sand sample: 85.97 wt. % of solids; 9.61 wt. % of bitumen; and 2.98 wt. % of moisture. About 50.0 grams of solvent DMSO were added to about 50.0 grams of the oil-sand sample in a 200-ml glass beaker (reactor) with a magnetic stirrer, thus giving rise to the solvent-to-sample ratio of about 1 to 1. This beaker (reactor), containing the resultant mixture of DMSO and oil (tar) sands, was maintained at a temperature of about 80 degrees C. by heating the beaker (reactor) on a temperature-controlled hot plate. The pressure in the beaker (reactor) remained at the ambient pressure of about 1 atm. After about 5 minutes, the liquid in the beaker (reactor) was decanted and filtered, and the solids remaining in the beaker were repeatedly washed with hot IPA (isopropanol) with a temperature near its boiling point and dried the beaker together with the filter paper to a constant weight in a vacuum oven. On the basis of weight loss, the conversion, i.e., the degree of extraction, of bitumen (organic matter) from the oil-sand sample was determined to be about 69.9 wt. %.

Example 3

The oil-sand sample treated in this example was from the same source as that used in the preceding example. Moreover, the same experimental procedure was followed as that of the preceding example except that the mixture in the beaker (reactor) was heated for about 15 minutes instead of 5 minutes. On the basis of weight loss, the conversion, i.e., the degree of extraction, of bitumen (organic matter) from the oil-sand sample was determined to be about 100 wt. %.

Example 4

In this example, bitumen (organic matter) in low-grade oil (tar) sands from Alberta, Canada was solubilized and extracted with solvent Cellosolve, which is of the analytical grade. Alberta Research Council provided the following proximate analyses for the oil-sand sample: 85.97 wt. % of solids; 9.61 wt. % of bitumen; and 2.98 wt. % of moisture. About 50.0 grams of solvent Cellosolve were added to about 50.0 grams of the oil-sand sample in a 200-ml glass beaker (reactor) with a magnetic stirrer, thus giving rise to the solvent-to-sample ratio of about 1 to 1. This beaker (reactor), containing the resultant mixture of Cellosolve and oil (tar) sands, was maintained at a temperature of about 80 degrees C. by heating the beaker (reactor) on a temperature-controlled hot plate. The pressure in the beaker (reactor) remained at the ambient pressure of about 1 atm. After about 15 minutes, the liquid in the beaker (reactor) was decanted and filtered, and the solids remaining in the beaker were repeatedly washed with hot IPA (isopropanol) with a temperature near its boiling point and dried the beaker together with the filter paper to a constant weight in a vacuum oven. On the basis of weight loss, the conversion, i.e., the degree of extraction, of bitumen (organic matter) from the oil-sand sample was determined to be about 84.3 wt. %.

Example 5

The oil-sand sample extracted in this example was from the same source as that used in the preceding example. Moreover, the same experimental procedure was followed as that of the preceding example except that the 50-gram mixture comprising 50 wt. % of DMSO and 50 wt. % of Cellosolve served as the solvent. On the basis of weight loss, the conversion, i.e., the degree of extraction, of bitumen (organic matter) from the oil-sand sample was determined to be about 82.7 wt. %.

Example 6

In this example, oil (organic matter) in oil-contaminated sands from the desert was solubilized and extracted with solvent DMSO, which is of the commercial grade. Alberta Research Council provided the following proximate analyses for the oil-contaminated sand sample: 87.63 wt. % of solids; 11.16 wt. % of oil; and 0.47 wt. % of moisture. About 50.0 grams of solvent DMSO were added to about 50.0 grams of the oil-contaminated sand sample in a 200-ml glass beaker (reactor) with a magnetic stirrer, thus giving rise to the solvent-to-sample ratio of about 1 to 1. This beaker (reactor), containing the resultant mixture of DMSO and oil-contaminated sands, was maintained at a temperature of about 80 degrees C. by heating the beaker (reactor) on a temperature-controlled hot plate. The pressure in the beaker (reactor) remained at the ambient pressure of about 1 atm. After about 15 minutes, the liquid in the beaker (reactor) was decanted and filtered, and the solids remaining in the beaker were repeatedly washed with hot IPA (isopropanol) with a temperature near its boiling point and dried the beaker together with the filter paper to a constant weight in a vacuum oven. On the basis of weight loss, the conversion, i.e., the degree of extraction, of oil (organic matter) from the oil-contaminated sand sample was determined to be about 81.9 wt. %.

Example 7

The oil-contaminated sand sample extracted in this example was from the same source as that used in the preceding example. Moreover, the same experimental procedure was followed as that of the preceding example except that Cellosolve served as the solvent. On the basis of weight loss, the conversion, i.e., the degree of extraction, of oil (organic matter) from the oil-contaminated sand sample was determined to be about 88.8 wt. %.

Example 8

In this example, coal from the Pittsburgh seam in Washington County, Pennsylvania was extracted with solvent DMSO. The coal sample was obtained from the Coal Bank at Pennsylvania State University, which provided the following proximate analyses for it; 2.00 wt % of as-received moisture, 9.25 wt. % of as-received dry ash, 38.63 wt. % of as-received dry volatile matter, and 50.12 wt. % of as-received dry fixed carbon. The particle size of coal sample ranged approximately between 20 mesh and 40 mesh. About 100 grams of solvent was gently added to about 50 grams of the coal sample in a 200-ml glass beaker (reactor) with a magnetic stirrer, thus giving rise to the reagent-to-sample ratio of 2 to 1. The beaker (reactor), containing the resultant mixture of DMSO and coal, was maintained at a temperature of about 100 degrees C. by heating the beaker (reactor) on a temperature-controlled hot plate. The pressure in the beaker (reactor) remained at the ambient pressure of about 1 atm. After about 30 minutes, the liquid in the beaker (reactor) was decanted and filtered and the solids remaining in the beaker (reactor) were repeatedly washed with IPA (isopropanol) with a temperature near its boiling point and dried the beaker together with the filter paper to a constant weight in a vacuum oven. On the basis of weight loss, the conversion, i.e., the degree of extraction, of the coal sample was determined to be about 13.0 wt. %.

Example 9

This example was identical to Example 8 in all aspects except that Cellosolve served as the solvent instead of DMSO and the amount of the solvent was about 150 grams instead of about 100 grams. The conversion, i.e., the degree of extraction, of the coal sample was determined to be about 2.6 wt. % on the dry basis instead of about 13.0 wt. % attained in Example 8.

The results for the extraction of hydrocarbon-containing organic matter from hydrocarbon-containing materials described in the specification, and especially in the Examples, were unexpected. Surprising advantages were realized in economic efficiencies achieved through practicing the claimed invention.

As used herein, the terms about and approximately should be interpreted to include any values which are within 20% of the recited value. Furthermore, recitation of the term about and approximately with respect to a range of values should be interpreted to include both the upper and lower end of the recited range. As used herein, the terms first, second, third and the like should be interpreted to uniquely identify elements and do not imply or restrict to any particular sequencing of elements or steps.

The present disclosure also includes a method, composition, kit, or apparatus made by combining the embodiments herein disclosed and those embodiments described in U.S. Pat. No. 7,767,722, U.S. Pat. No. 8,101,812, U.S. 2010/0173806, U.S. 2009/0250381 or U.S. 61/594,129, which are incorporated herein by reference in their entirety.

While the invention has been shown or described in only some of its embodiments, it should be apparent to those skilled in the art that it is not so limited, but is susceptible to various changes without departing from the scope of the invention.

The invention claimed is:

1. A method of extracting hydrocarbon-containing organic matter from a hydrocarbon-containing material into a hydrocarbon-extracting solvent, comprising the steps of:

providing a first liquid comprising a hydrocarbon-extracting solvent comprising at least about 30% by volume DMSO and at least about 30% by volume 2-Ethoxyethanol;

contacting the hydrocarbon-containing material with said hydrocarbon-extracting solvent such that an extraction mixture is formed, the extraction mixture comprising at least a portion of said hydrocarbon-containing organic matter extracted into the hydrocarbon-extracting solvent; and separating the extraction mixture from any residual material containing non-soluble material from the hydrocarbon-containing material that is not soluble in the hydrocarbon-extracting solvent.

2. The method of claim 1, further comprising the step of:

contacting said hydrocarbon-containing organic matter and said hydrocarbon-extracting solvent in situ in an underground formation containing said hydrocarbon-containing organic matter, and extracting said hydrocarbon-containing organic matter from said underground formation.

3. The method of claim 1, further comprising the step of:

separating the extraction mixture into a first portion and a second portion, the first portion of the extraction mixture comprising a hydrocarbon product comprising at least a portion of the hydrocarbon-containing organic matter, the second portion of the extraction mixture comprising at least a portion of the hydrocarbon-extracting solvent.

4. The method of claim 3, further comprising the step of:

recycling at least a portion of the hydrocarbon-extracting solvent for re-use in the contacting step.

5. The method of claim 2, wherein the hydrocarbon-containing material is in an underground formation and the contacting of the hydrocarbon-containing material with said hydrocarbon-extracting solvent occurs in situ in the underground formation; and further comprising the step of:

recovering the extraction mixture through a production well in fluid communication with the underground formation, wherein the residual material remains in situ in the underground formation.

6. The method of claim 5, further comprising the step of injecting a hydrocarbon-extracting solvent liquid stream into the underground formation for further extraction of hydrocarbon material.

7. The method of claim 1, wherein the hydrocarbon-extracting solvent comprises about 50% by volume DMSO, and about 50% by volume 2-Ethoxyethanol.

8. The method of claim 1, wherein the hydrocarbon-extracting solvent comprises DMSO and 2-Ethoxyethanol, wherein the ratio of said DMSO to said 2-Ethoxyethanol is at least about 1.3:1.

9. The method of claim 1, wherein the amount of organic matter extracted from the hydrocarbon-containing material is at least about 50%.

10. The method of claim 9, wherein the amount of organic matter extracted from the hydrocarbon-containing material is at least about 90%.

11. The method of claim 10, wherein the amount of organic matter extracted from the hydrocarbon-containing material is about 100%.

12. The method of claim 1, wherein at least about 80% of hydrocarbons present in said hydrocarbon-containing material extractable into said hydrocarbon-extracting solvent, are extracted into said hydrocarbon-extracting solvent within about 15 minutes of contacting said hydrocarbon-containing material with said first liquid.

13. The method of claim 1, wherein said first liquid comprises said hydrocarbon-extracting solvent and another solvent miscible with said hydrocarbon-extracting solvent in a ratio of at least about 1:1 by volume.

14. The method of claim 13, wherein said first liquid comprises said hydrocarbon-extracting solvent and another solvent miscible with said hydrocarbon-extracting solvent in a ratio of at least about 9:4 by volume.

15. The method of claim 14, wherein said first liquid comprises said hydrocarbon-extracting solvent and another solvent miscible with said hydrocarbon-extracting solvent in a ratio of at least about 4:1 by volume.

16. The method of claim 1, wherein said first liquid consists essentially of said hydrocarbon-extracting solvent.

17. The method of claim 1, wherein the hydrocarbon-containing material is contacted with said hydrocarbon-extracting solvent in a ratio of at least about 2:1 of said hydrocarbon-extracting solvent to said hydrocarbon-containing material by weight.

18. The method of claim 1, wherein the hydrocarbon-containing material is a natural hydrocarbon-containing material from a naturally occurring geological formation containing at least one of oil shale, coal, oil (tar) sands, heavy crude oil, crude oil, and natural gas.

19. The method of claim 18, wherein during said contacting, the hydrocarbon-containing organic matter extracted into the hydrocarbon-extracting solvent is in an amount that corresponds to an amount of from about 30 to about 100% of hydrocarbon-containing organic matter originally contained within said natural hydrocarbon-containing material, extracted into the hydrocarbon-extracting solvent within from about 3 seconds to 180 minutes of said contacting, at a contacting temperature in a range of from about 10 to 400° C., at a weight ratio of hydrocarbon-extracting solvent to the natural hydrocarbon-containing material of from about 10% to 600%.

20. The method of claim 19, wherein during said contacting, the hydrocarbon-containing organic matter extracted into the hydrocarbon-extracting solvent is in an amount that corresponds to an amount of from about 75 to about 100% of hydrocarbon-containing organic matter originally contained within said natural hydrocarbon-containing material, extracted into the hydrocarbon-extracting solvent within from about 3 seconds to 3 minutes of said contacting, at a contacting temperature in a range of from about 20 to 160° C., at a weight ratio of hydrocarbon-extracting solvent to the natural hydrocarbon-containing material of from about 1:1 to about 3:1 by weight.

21. The method of claim 19, wherein during said contacting, the hydrocarbon-containing organic matter extracted into the hydrocarbon-extracting solvent is in an amount that corresponds to an amount of from about 80 to about 100% of hydrocarbon-containing organic matter originally contained within said natural hydrocarbon-containing material, extracted into the hydrocarbon-extracting solvent within from about 3 seconds to 3 minutes of said contacting, at a contacting temperature in a range of from about 20 to 90° C., at a weight ratio of hydrocarbon-extracting solvent to the natural hydrocarbon-containing material of from about 1:1 to 3:1 by weight.

22. The method of claim 1 for extracting hydrocarbon-containing organic matter from a hydrocarbon-containing material, said hydrocarbon material comprising oil (tar) sands, wherein the contacting of the hydrocarbon-containing material with said hydrocarbon-extracting solvent comprises the step of supplying the oil (tar) sands to an interior portion of an extraction vessel and supplying the hydrocarbon-extracting solvent to the interior portion of the extraction vessel for a period of time operable to extract a substantial portion of the hydrocarbon-containing organic matter from the hydrocarbon-containing material.

23. The method of claim 1 for extracting hydrocarbon-containing organic matter from a hydrocarbon-containing material, said hydrocarbon material comprising oil shale, the method further comprising the step of:

grinding the hydrocarbon-containing organic matter to form a plurality of particles, the particles defining an average diameter size in the range of 0.01 mm to 25 mm such that the plurality of particles is contacting the hydrocarbon-extracting solvent.

24. A method for recovering hydrocarbon-containing organic matter from oil (tar) sands, the method comprising the steps of extracting the hydrocarbon-containing organic matter by a process comprising:

obtaining oil (tar) sands comprising recoverable hydrocarbon-containing organic matter;

providing a hydrocarbon-extracting solvent comprising at least about 30% by volume DMSO and at least about 30% by volume 2-Ethoxyethanol;

supplying the oil (tar) sands sample to a contacting vessel, said contacting vessel comprising at least one inlet for supplying the hydrocarbon-extracting solvent;

contacting the oil (tar) sands sample with the hydrocarbon-extracting solvent in a contacting vessel and agitating the oil (tar) sands sample with the hydrocarbon-extracting solvent such that an extraction mixture is formed and a residual material is formed, the extraction mixture comprising at least a portion of the hydrocarbon-containing organic matter in the hydrocarbon-extracting solvent, the residual material comprising at least a portion of non-soluble material from the oil (tar) sands that is not soluble in the hydrocarbon-extracting solvent;

separating the extraction mixture from the residual material;

separating the extraction mixture into a hydrocarbon product stream and a hydrocarbon-extracting solvent liquid stream, the hydrocarbon product stream comprising at least a portion of the hydrocarbon-containing organic matter from the oil (tar) sands; and recycling at least a portion of the hydrocarbon-extracting solvent liquid stream to the contacting step.

25. The method of claim 24, further comprising washing the residual material with an alcohol.

26. The method of claim 25, wherein said alcohol is at or near its boiling point.

27. The method of claim 25, wherein said oil (tar) sands is contacted with said hydrocarbon-extracting solvent in a ratio of between about 0.5:1 and about 4:1 by weight.

28. The method of claim 27, wherein said oil (tar) sands is contacted with said hydrocarbon-extracting solvent in a ratio of between about 1:1 and about 3:1 by weight.

29. The method of claim 25, wherein said oil (tar) sands is contacted with said hydrocarbon-extracting solvent at a temperature of between about 30° C. and about 160° C.

30. The method of claim 29, wherein said oil (tar) sands is contacted with said hydrocarbon-extracting solvent at a temperature of between about 60° C. and about 100° C.

31. A method of extracting hydrocarbon-containing organic matter from a hydrocarbon-containing material into a hydrocarbon-extracting solvent, comprising the steps of:

providing a first liquid comprising a hydrocarbon-extracting solvent selected from DMSO, 2-Ethoxyethanol, or a mixture thereof;

contacting the hydrocarbon-containing material with said hydrocarbon-extracting solvent such that an extraction mixture is formed, the extraction mixture comprising at least a portion of said hydrocarbon-containing organic matter extracted into the hydrocarbon-extracting solvent; and separating the extraction mixture from any residual material containing non-soluble material from the hydrocarbon-containing material that is not soluble in the hydrocarbon-extracting solvent, wherein said hydrocarbon-containing organic matter is contacted with said hydrocarbon-extracting solvent at a temperature of between about 70° C. and about 160° C.

32. The method of claim 25, wherein said oil (tar) sands is contacted with surfactant-free hydrocarbon-extracting solvent.

33. The method of claim 25, wherein said oil (tar) sands is contacted with non-aqueous hydrocarbon-extracting solvent.

34. The method of claim 25, wherein said oil (tar) sands is contacted with surfactant-free and non-aqueous hydrocarbon-extracting solvent.

35. A method for increasing recovery of hydrocarbon-containing organic matter from a production well coupled to a hydrocarbon-containing sub-surface formation, the subsurface formation comprising hydrocarbon-containing material, the method comprising the steps of extracting the hydrocarbon-containing organic matter by a process comprising:

providing an injection well, said injection being in fluid communication with the sub-surface formation;

providing a hydrocarbon-extracting solvent comprising at least about 30% by volume DMSO, and at least about 30% by volume 2-Ethoxyethanol;

injecting the hydrocarbon-extracting solvent through the injection well and into the formation, wherein the hydrocarbon-extracting solvent and the hydrocarbon-containing organic matter from the hydrocarbon containing sub-surface formation form an extraction mixture comprising at least a portion of the extraction mixture hydrocarbon-containing organic matter in at least a portion of the hydrocarbon-extracting solvent;

recovering the extraction mixture from the formation through the production well; and separating the extraction mixture to produce a hydrocarbon product stream and a hydrocarbon-extracting solvent liquid stream.

36. The method of claim 1, wherein said hydrocarbon-containing material is selected from organic garbage, fossils fuel, plastics, rubber, or a combination thereof.

37. The method of claim 1, wherein the hydrocarbon-extracting liquid further comprises at least one turpentine liquid.

38. A method of extracting hydrocarbon-containing organic matter from a hydrocarbon-containing material into a hydrocarbon-extracting solvent, comprising the steps of:

providing a first liquid comprising a hydrocarbon-extracting solvent selected from DMSO, 2-Ethoxyethanol, or a mixture thereof;

contacting the hydrocarbon-containing material with said hydrocarbon-extracting solvent such that an extraction mixture is formed, the extraction mixture comprising at least a portion of said hydrocarbon-containing organic matter extracted into the hydrocarbon-extracting solvent; and separating the extraction mixture from any residual material containing non-soluble material from the hydrocarbon-containing material that is not soluble in the hydrocarbon-extracting solvent, wherein said first liquid comprises said hydrocarbon-extracting solvent and another solvent miscible with said hydrocarbon-extracting solvent in a ratio of at least about 1:1 by volume.

* * * * *